Aug. 25, 1931. W. J. LOERKE 1,820,669
CONVEYER OR HANDLING DEVICE
Filed July 26, 1929
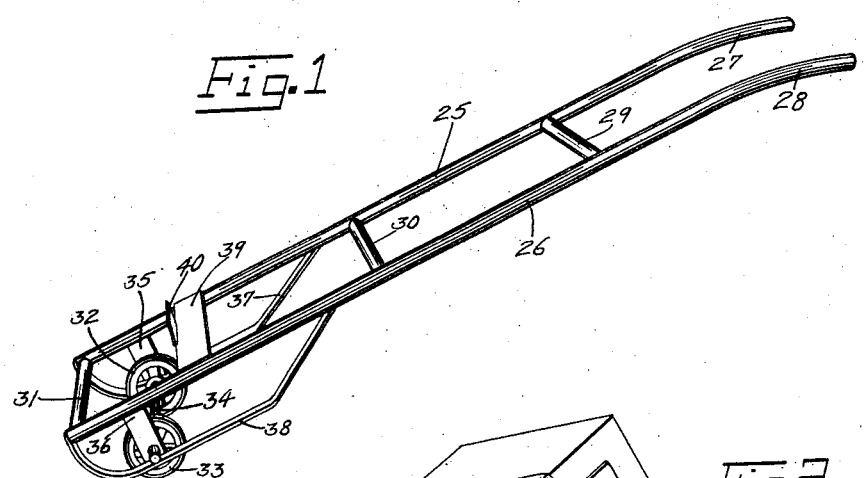
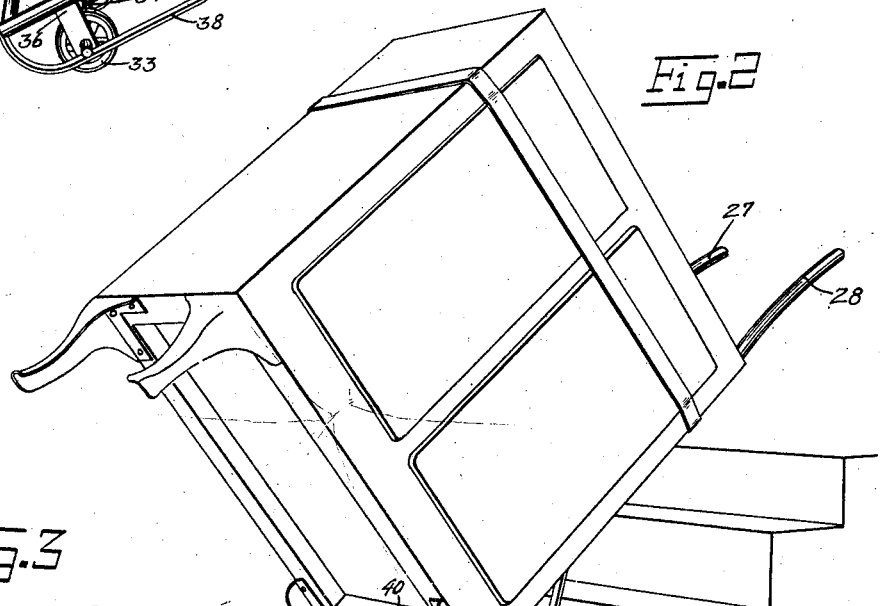
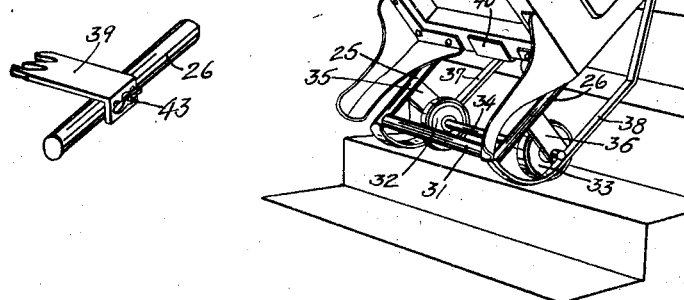
Inventor
Walter J Loerke Patented Aug. 25, 1931

1,820,669

UNITED STATES PATENT OFFICE

WALTER J. LOERKE, OF DAYTON, OHIO, ASSIGNOR OF ONE-THIRD TO F. P. LUTZ AND ONE-THIRD TO EARL F. McCLINTOCK, BOTH OF DAYTON, OHIO

CONVEYER OR HANDLING DEVICE

Application filed July 26, 1929. Serial No. 381,349.

This invention relates to improvements in conveyers or handling devices and more particularly refers to such devices for handling heavy and bulky articles of furniture and the like.

I am aware that much has been done in the past to facilitate the handling of heavy and bulky articles on level floors or other comparatively smooth surfaces. However, more serious obstacles are met with in loading and unloading heavy and bulky pieces of furniture from delivery trucks and transferring them up stairways and into homes. The usual handling device is provided with two or more wheels and it is difficult, when moving the article up a stairway to raise the wheels over the projecting angles of the steps. Likewise, the ordinary conveyer of this type is difficult to control when descending the stairway as the wheels tend to drop off of each step with sufficient shock to cause damage to the object being transported or injury to the operator.

Usually, where an object of heavy size and weight is to be moved over extremely uneven surfaces, as to be moved up or down stairways, or to be loaded onto a truck or unloaded therefrom, three, and sometimes more, men are required to safely handle the article, and even then the fine finish applied to most articles of furniture today is frequently marred.

It is therefore an object of this invention to provide a handling device having, in addition to the usual set of wheels, a set of runners or gliders which become effective to assume the load on sharply irregular surfaces and to facilitate movement of heavy objects over edges of platforms and the like.

Another object is to provide a handling device designed to reduce the labor required to move heavy objects over inclined ways having marked irregularities in the surface thereof, thereby materially reducing the cost of delivery of such articles.

With these and incidental objects in view, the invention consists of certain novel features of construction and combination of parts, the essential elements of which are set forth in appended claims and a preferred form of embodiment of which is hereinafter described with reference to the drawings which accompany and form a part of this specification.

In said drawings:

Fig. 1 is a perspective view of my improved handling device or conveyer.

Fig. 2 is a perspective view of the device in use showing in particular the use of the runners or gliders in moving a heavy bulky piece of furniture up a series of steps.

Fig. 3 is a detail view showing the method of adjusting the support.

I illustrate my improved handling device as designed to handle a particular object, namely, an electric refrigerator, however, it is to be understood that by changing the proportions of the device it may be constructed to handle objects of any reasonable size and shape and it is not intended to limit the use or adaptation of the handling device.

The body of the conveyer comprises parallel tubular rods 25 and 26 (Fig. 1) having long curved upper ends forming handles 27 and 28, and being joined together at intervals by cross rods 29, 30 and 31. The length and curvature of the handles 27 and 28 form important features of the device and may be varied in different individual conveyers to suit particular conditions.

The cross rods 29, 30 and 31 are welded to the side rods 25 and 26 thus eliminating bolts and nuts, making for a smooth and strong unions.

A pair of rubber-tired wheels 32 and 33 are rotatably mounted on an axle 34 extending between and secured in brackets 35 and 36 projecting downwardly from the side rods 25 and 26 respectively and being secured thereto.

I secure runners or gliders 37 and 38 to the side rods 25 and 26, the runners passing beneath the projecting ends of the axle 34 which acts to brace the gliders 37 and 38 when they rest on a projection or projections. The upper ends of the gliders 37 and 38 form acute angles with the under sides of their respective side rods providing a skiing action when the conveyer is being used to transport objects upstairs as disclosed in Fig. 2 of the drawings. The lower ends of the gliders form curves, the upper or inner ends thereof abutting against and being welded to the lower ends of the side rods 25 and 26.

At the proper distance above the point where the brackets 35 and 36 join the side rods 25 and 26, I secure a cross bar 39 having an angle portion 40 projecting upwardly from the lower edge thereof upon which to rest the object to be transported as may be clearly seen in Fig. 2.

The position of the bar 39 and the supporting angle 40 is located to suit the center of gravity of the particular object to be handled.

In practice the conveyer may be made with the supporting bar 39—40 welded to the side bars 25 and 26 when the device is to be used to deliver or handle objects of a given size and shape. For instance, where refrigerators are to be delivered or distributed on a large scale the position of the bar 39—40 may be predetermined and the bar itself welded to the side bars 25 and 26. Or where smaller companies deliver, for instance, stoves, washing machines, refrigerators, etc., the support bar 39—40 may be made adjustable as shown in Fig. 3, by bending the ends of the bar 39 downwardly outside the side bars 25 and 26 to form ears through holes in which suitable bolts 43 (only one of which is shown) may be passed to secure the bar to the side members, holes being provided at intervals in the side rods to receive the bolts. Thus the bar 39—40 may be shifted up or down the conveyer to a position determined by the particular object to be handled.

It can be seen by reference to Fig. 2 that the support bar 39—40 is so located that the feet of the legs of the refrigerator resting thereon are approximately in the same plane as the curved lower ends of the gliders 37 and 38. The purpose of this construction is to facilitate placing the box in its upright position by merely raising the handles 27 and 28, the ends of the gliders taking the weight of the object from the wheels 32 and 33 thereby preventing displacement of the conveyer and insuring accurate and easy installation of the object in the designated position.

While the form of mechanism herein shown and described is admirably adapted to fulfill the objects primarily stated, it is to be understood that it is not intended to confine the invention to the one form of embodiment herein disclosed for it is susceptible of embodiment in various forms, all coming within the scope of the claims which follow.

What is claimed is:

1. In a conveyer; the combination of a frame comprising side members, said members being joined by cross rods; brackets extending downwardly from the side members; a wheel supporting axle extending between the brackets, the ends of the axle projecting beyond the brackets; glider bars having their upper ends bent and being secured to the side members and forming acute angles therewith, the lower ends of the glider bars being curved and secured to the lower ends of side members substantially at right angles thereto; a support bar extending between the side members, the end of the support bar being bent downwardly to adjustably secure said bar to the side members; a projection bent upwardly at right angles to the support bar, the length of the projection being less than the length of the support bar.

2. In a conveyer, the combination of a frame comprising side members, said members being joined by cross rods; brackets extending downwardly from the side members; a wheel supporting axle extending between the brackets; glider bars secured to the side members; a support bar extending across and resting on top of the side members; and ears bent downwardly from the ends of the support bar and outside of the side members to adjustably secure the support bar to the side members.

3. In a conveyer, the combination of a frame comprising tubular side members terminating in long curved handles and being joined by tubular cross rods; brackets extending downwardly from the side members; a rod extending between the brackets, said rod carrying wheels upon which the conveyer travels on smooth level surfaces; glider bars secured to the side members upon which gliders the conveyer travels over angular projections; a support bar extending across and resting on top of the side members, said support bar having an angular projection extending upwardly to support an object, a plurality of angular projections extending downwardly from the support bar to adjustably secure said support bar to the side members.

4. In a conveyer, including a frame comprising tubular side members spaced apart at intervals by tubular cross bars, the frame being supported at the lower end by wheels, the upper ends of the side members terminating in handles; the combination of rounded glider bars secured to the underside of the side members to roll the conveyer and its cargo to an upright position; and a flat support bar, extending across and resting on top of the side members, the support bar being adjustably secured to the side members to carry cargo at the proper height whereby the lower end of said cargo registers with the lower end of the glider bar.

5. In a conveyer including a frame, comprising tubular side members spaced apart at intervals by tubular cross bars, the side members having spaced holes to the side thereof, said frame being supported at its lower end by wheels; the combination of glider bars secured to the underside of the frame members, the lower ends of the glider bars being curved to roll the conveyer and its cargo to an upright position; a flat support bar extending across and resting on top of the side members; an angular projection to support the cargo; and angular projections extending downwardly from the ends of the support bar, said last mentioned projections being provided with holes through which bolts may be passed to adjustably secure the support bar to the side members at the proper height.

In testimony whereof I affix my signature.

WALTER J. LOERKE.